United States Patent
Gardner

(10) Patent No.: US 6,820,781 B1
(45) Date of Patent: Nov. 23, 2004

(54) ALL TERRAIN VEHICLE STORAGE RACK

(76) Inventor: Gary M. Gardner, 2295 Hartsell Rd., Elkton, MI (US) 48731

( * ) Notice: Subject to any disclaimer, the term of this patent is extended or adjusted under 35 U.S.C. 154(b) by 113 days.

(21) Appl. No.: 10/263,582

(22) Filed: Oct. 4, 2002

(51) Int. Cl.[7] ................................................. B60R 7/00
(52) U.S. Cl. .......................... 224/401; 224/546; 224/547
(58) Field of Search ................................ 224/401, 410, 224/546, 547, 558

(56) References Cited

U.S. PATENT DOCUMENTS

| | | |
|---|---|---|
| 2,425,892 A | 8/1947 | Michaels |
| 2,618,509 A | 11/1952 | Carlson |
| 2,646,910 A | 7/1953 | Wiershing |
| 3,734,439 A * | 5/1973 | Wintz ..................... 248/224.51 |
| 3,968,912 A * | 7/1976 | Horwitz ....................... 224/457 |
| 4,006,852 A * | 2/1977 | Pilsner et al. ................ 224/509 |
| 4,011,951 A * | 3/1977 | Boyer ...................... 211/85.21 |
| 4,176,771 A | 12/1979 | Dubvroc, Sr. |
| 4,247,030 A | 1/1981 | Amacker |
| 4,277,008 A | 7/1981 | McCleary |
| 4,300,706 A | 11/1981 | Hendrick et al. |
| 4,770,428 A * | 9/1988 | Sugiyama ..................... 280/834 |
| 5,029,720 A * | 7/1991 | Bridges ....................... 220/737 |
| D364,140 S | 11/1995 | Gustavsen |
| 5,474,273 A * | 12/1995 | Vinal ....................... 248/311.2 |
| 5,595,333 A * | 1/1997 | Boston ......................... 224/536 |
| 5,727,642 A * | 3/1998 | Abbott ....................... 180/65.1 |
| 5,816,462 A | 10/1998 | Brantley |
| 6,045,017 A * | 4/2000 | Connell ..................... 224/148.7 |
| 6,145,718 A | 11/2000 | Edwards |
| 6,179,180 B1 | 1/2001 | Walker |

FOREIGN PATENT DOCUMENTS

EP 0573981 A1 12/1993

* cited by examiner

Primary Examiner—Stephen K. Cronin
(74) Attorney, Agent, or Firm—John J. Swartz

(57) ABSTRACT

An all terrain vehicle storage rack including an L-shaped bracket having a base for supporting a container thereon and an upstanding leg for detachably mounting on the back of an all terrain vehicle storage rack. A forward portion of at least one container retaining ring is secured to the upstanding leg. A rear portion of the ring is secured and to a rigidifying bar which spans the terminal end of the base and a rear portion of the container ring.

31 Claims, 4 Drawing Sheets

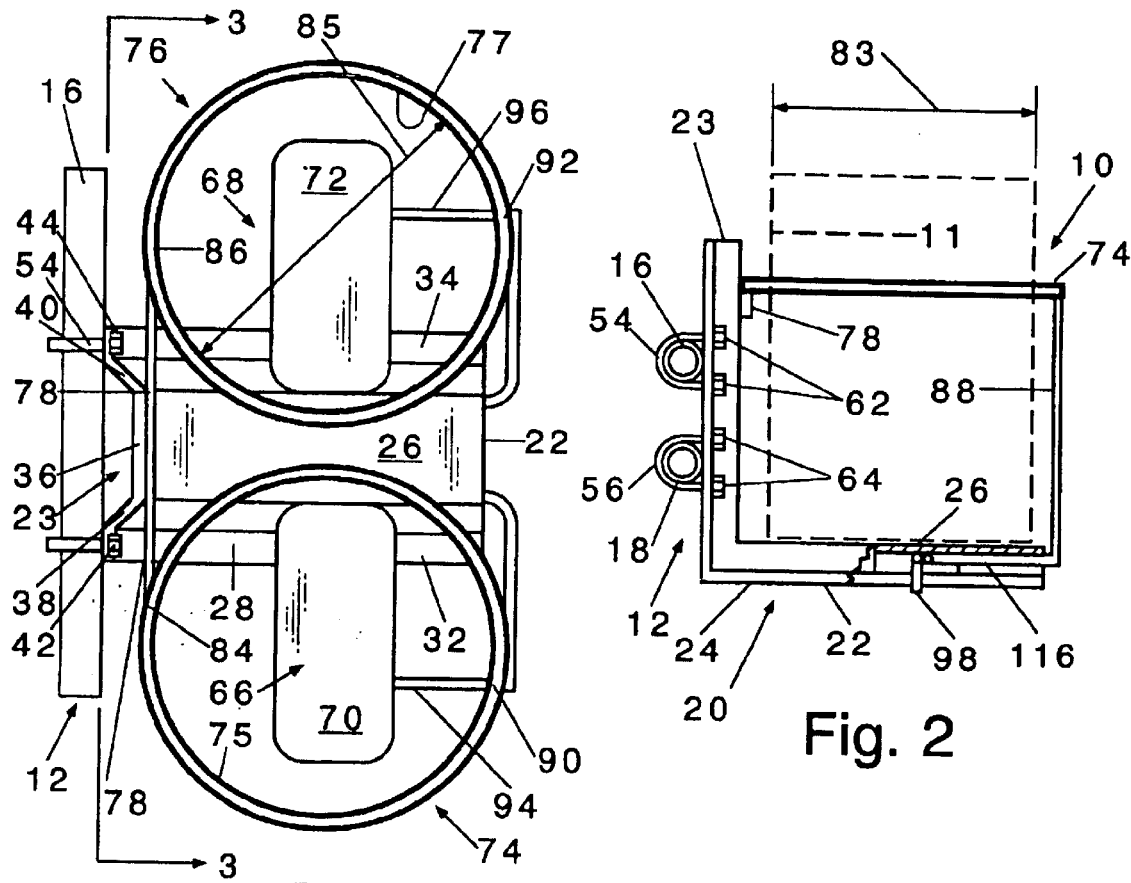
Fig. 1
Fig. 2
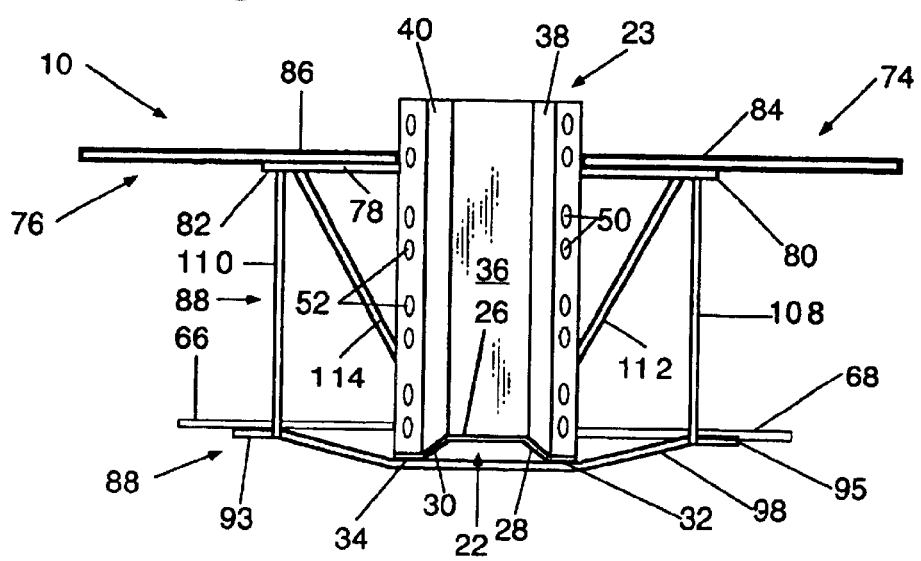
Fig. 3

# US 6,820,781 B1

ALL TERRAIN VEHICLE STORAGE RACK

BACKGROUND OF THE INVENTION

1. Field of the Invention

This invention relates to a storage rack for an all terrain vehicle and more particularly to a container support rack which will accommodate containers of varying heights and diameters.

2. Description of the Prior Art and Objects

All terrain vehicles (ATV) are typically three or four wheeled vehicles having a seat for one or more passengers and a rear storage rack which typically includes a plurality of spaced apart horizontal steel tubes and a plurality of vertically spaced apart rearwardly horizontally disposed retaining tubes. These racks typically provide limited storage space for fishermen, farmers, bird watchers, and others who use all terrain vehicles to travel into the wilderness. Fishermen, for example, typically want to carry a minnow bucket and also a second bucket in which they place the fish which they catch. Bird watchers frequently want to separately store different bird seed. Also, a farmer may want a container for seed and a second container for tools or fertilizer. Accordingly, it is an object of the present invention to provide a new and novel storage rack for storing a plurality of containers on an ATV storage rack.

U.S. Pat. No. 6,179,180B1 issued to John F. Walker, on Jan. 30, 2001, discloses a carrier accessory for attaching containers having enlarged diameter rims thereon in a plurality of rings which are mounted on the rear of the all terrain vehicle. Frequently, fishermen, farmers, bird watchers, etc., have rimless containers or containers which have a smaller or larger diameter than the rings illustrated in the Walker patent and thus, the Walker device is of limited use. Accordingly, it is another object of the present invention to provide an all terrain vehicle storage rack which will accommodate rimless containers.

It is yet another object of the present inventions to provide an all terrain vehicle storage rack which will accommodate containers of varying diameters or breadths.

Yet another object of the present invention is to provide an all terrain storage rack of the type described which will accommodate rimless containers having varying heights.

Still another object of the present invention is to provide an all terrain storage vehicle of type described which includes a platform for underlying a container supported thereon and a container ring which envelopes a container supported thereon.

A further object of the present invention is to provide an all terrain vehicle storage rack of the type described which includes an L-shaped mounting bracket having a horizontal base which supports a container thereon and an upstanding leg on which a container retaining ring is mounted.

A still further object of the present invention is to provide an all terrain vehicle storage rack of the type described including rigidifying rods which span the terminal end of the base leg and are tangentially fixed to a portion of the retainer ring remote from the upstanding leg.

Still yet another object of the present invention is to provide an all terrain vehicle storage rack of the type described which includes a one-piece rigidifying rod which couples the base to a portion of the retainer ring remote from the upstanding leg.

A further object of the present invention is to provide an all terrain vehicle storage rack of the type described wherein the upstanding leg includes a plate having a pair of rows of vertically spaced apertures through which fasteners, such as U-bolts, are disposed to couple the plate to the support rack of an all terrain vehicle.

Another object of the present invention is to provide an all terrain vehicle of the type described in which the vertical leg includes an upstanding plate of a predetermined breadth and a transverse bar having terminal ends which are fixed are tangentially fixed to a pair of laterally spaced container receiving rings.

Another object of the present invention is to provide an all terrain vehicle storage rack of the type described wherein the horizontal leg include a pair of container support wings projecting laterally outwardly from opposite sides of the horizontal platform to provide a pair of laterally spaced container supports aligned with a pair of laterally spaced overlying container rings.

Yet another object of the present invention is to provide an all terrain vehicle storage rack of the type described including a rigidifying rod which spans the platform and the container support wings, and thence spans the container support wings and tangentially couples to a portion of each ring remote from the upstanding leg, and finally spans the terminal end of the horizontal platform and each ring.

The aforementioned Walker U.S. Pat. No. 6,179,180B1, discloses mounting brackets which are laterally or horizontally spaced apart a substantial distance that would prevent the use of the Walker bracket on many current ATV racks. Typically, the top rail on many ATV racks is relatively short and thus, the mounting brackets must be laterally closely spaced. Accordingly, it is another object of the present invention to provide a new and novel all terrain vehicle support rack which is adapted to be mounted on a wider variety of all terrain vehicle racks than the prior art permits.

The lack of an underlying support platform disclosed in the Walker patent seriously limits the load capacity thereof. Accordingly, it is another object of the present invention to provide a new and novel all terrain vehicle support rack which has a higher load capacity than the prior art.

In the prior art patented Walker construction, the buckets project downwardly below the brackets a substantial distance which, under certain conditions, can cause the bottom of the containers to come in contact with ground brush and debris and perhaps even the ATV rear tires. Accordingly, it is another object of the present invention to provide a new and novel all terrain vehicle storage rack which overcomes the problems with the existing prior art all terrain vehicle carrier accessories.

Other objects and advantages of the present invention will become apparent to those of ordinary skill in the art as the description thereof proceeds.

SUMMARY OF THE INVENTION

A storage rack for an all terrain vehicle including an L-shaped bracket having a horizontal leg for supporting a container thereon and an upstanding leg, mechanism for detachably coupling the upstanding leg to an all terrain vehicle; at least one endless bucket receiving retainer for freely receiving a container supported on the horizontal leg and coupled to the vertical leg; and upstanding hoop mounting rods spanning the horizontal leg and the ring.

DESCRIPTION OF THE DRAWINGS

The invention may be more readily understood by referring to the accompanying drawings, in which:

FIG. 1 is a top plan view of a storage rack constructed according to the present invention mounted on the rear end of an ATV storage rack;

FIG. 2 is a slightly reduced side elevational view thereof, part of the horizontal leg being broken away to better illustrate the loop support ring spanning the rear of the loop and the rear of the leg;

FIG. 3 is a rear elevational view thereof, taken along the line 3—3 of FIG. 1;

DESCRIPTION OF THE PREFERRED EMBODIMENT

Figure 4:
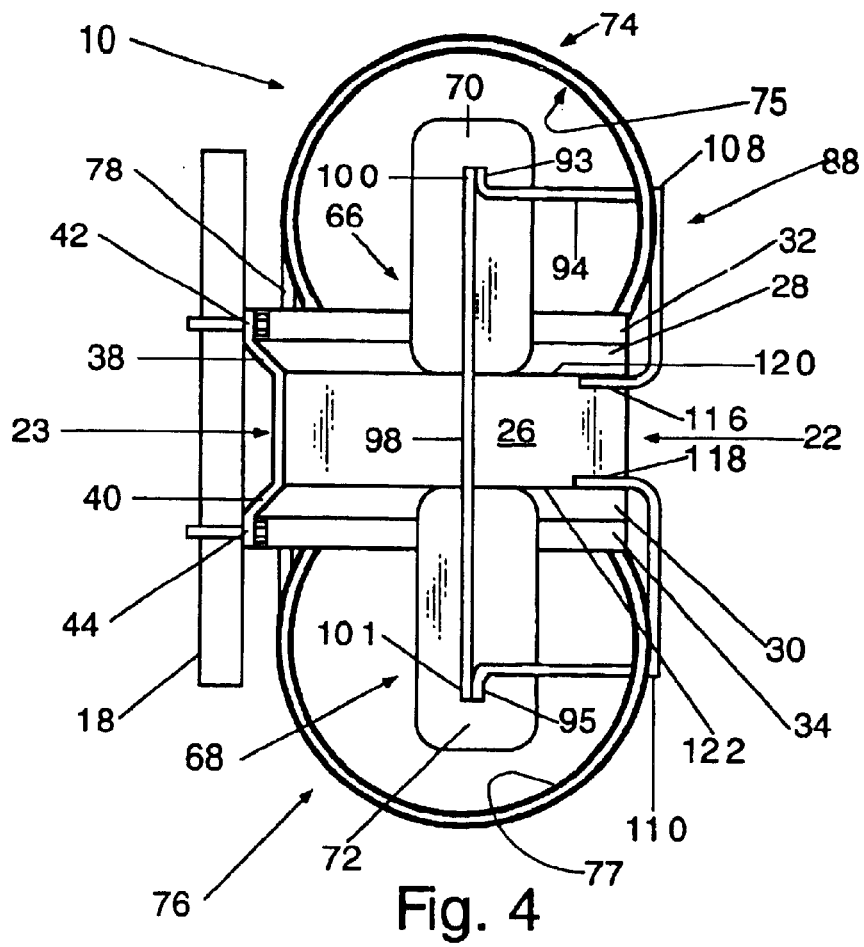
FIG. 4 is a bottom view thereof.
Figure 5:
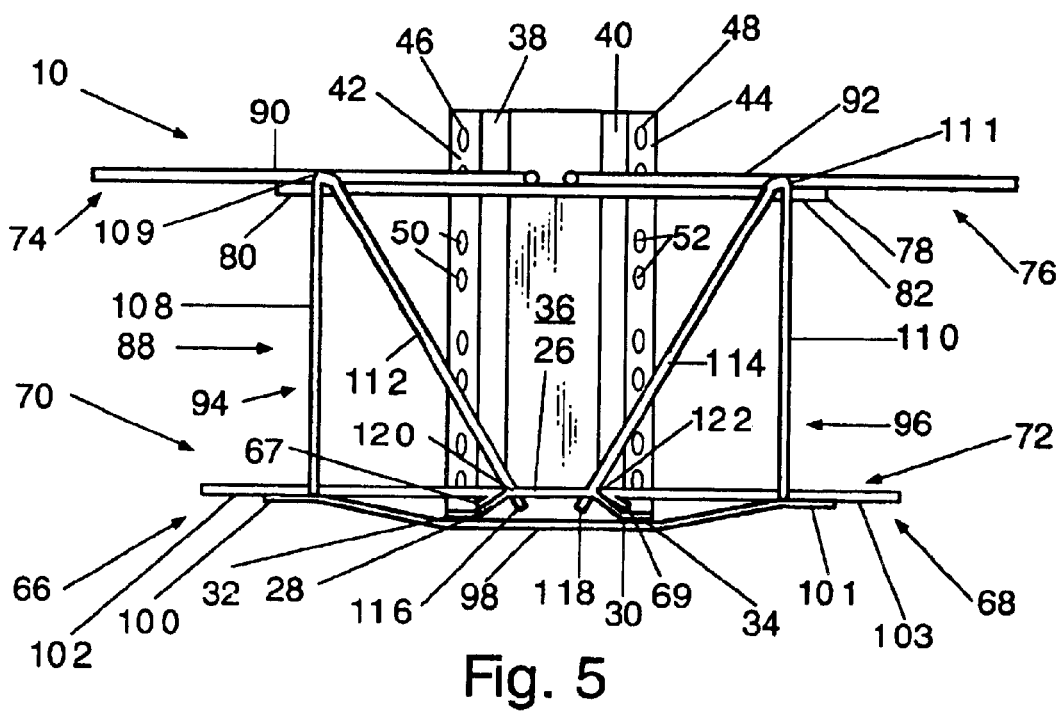
FIG. 5 is a front elevational view thereof.

A storage rack, generally designated 10, constructed according to the present invention, is particularly adapted for use in mounting an article, such as a bucket or container, illustrated in platform lines at 11, on a rear storage rack, generally designated 12, mounted at the rear of an all terrain vehicle (ATV). The ATV storage rack 12 include a plurality of horizontally spaced apart parallel steel support tubes (not shown) and a pair of parallel, vertically spaced apart transversely extending, horizontal tubular members 16 and 18 located at the rear most portion of the rack 12.

The storage rack 10, constructed according to the present invention, includes an L-shaped frame, generally designated 20, having a horizontal base leg 22 and a vertical leg 23 integrally coupled to the front end 24 of horizontal leg 22. The base leg 22 includes an elongate horizontal plate 26 having laterally spaced apart downwardly diverging legs 28 and 30 which terminate in horizontal flanges 32 and 34, respectively. The upstanding leg 23 includes a vertical plate 36 having laterally spaced forwardly diverging legs 38 and 40 terminating in terminal flanges 42 and 44 which lie in the same vertical plane and include laterally spaced apart rows 46 and 48 of vertically spaced apertures 50 and 52, respectively, for receiving pairs of vertically spaced U-bolts 54 and 56 which are detachably held to tubular members 16 and 18 via nuts 62 and 64 are threaded onto the U-bolts 54 and 56.

Welded, or otherwise suitably secured to the laterally outer faces of the depending legs 28 and 30, are the laterally inner, downwardly extending, angled flanges 67 and 69 of laterally outwardly extending, container supporting wings or plates 66 and 68, respectively, having terminal ends 70 and 72, respectively, on which a pair of the containers or buckets 11 are vertically supported.

A pair of container retainer rings, loops or circular hoops 74 and 76 are mounted on the upstanding leg 23 via a transverse crossbar 78 welded to plate 36 and having terminal ends 80 and 82 which are tangentially welded to forward circumferential portions 84 and 86 of rings 74 and 76, respectively. The rings 74 and 76 include bucket receiving apertures 75 and 77 therethrough for receiving articles such as bucket 11 having a predetermined diameter 83. The loops or hoops 74 and 76 having an inner diameter 85 typically larger than the bucket diameter 83.

A second rigidifying mount, generally designated 88, is provided for supporting the forward diametrically opposite distal portions 90 and 92 of the rings 74 and 76, respectively. The rigidifying mount 88 includes a transverse base rod 98 welded or otherwise suitably fixed to the undersides of the flanges 32 and 34 and including terminal ends 100 and 101, respectively, welded or otherwise suitably fixed to the undersides 102 and 103 of the container support wings 66 and 68, respectively. The mount 88 includes a pair of rearwardly and upwardly extending legs 94 and 96 which include forward ends 93 and 95 are welded to the terminal ends 100 and 101, respectively, and to the undersides 102 and 103, respectively, The rods 94 and 96 include upwardly extending integral rod portions 108 and 110, respectively, which include upper ends 109 and 111, respectively, tangentially welded to the forward distal ring portions 90 and 92, respectively. The rigidifying mount 88 also includes a pair of downwardly converging rod sections 112 and 114 integral with the rods 108 and 110, respectively, and having forwardly extending horizontal terminal rod sections 116 and 118 welded to the junctions 120 and 122 of the plate 26 and the legs 28 and 30, respectively.

THE OPERATION

The storage rack 10 is coupled to the rear horizontal bars 16 and 18 of the ATV storage rack 12 via U-bolts 54, 56 and nuts 62, 64 in the position illustrated in FIGS. 1–5. A pair of buckets or containers 11 are disposed within the apertures 75, 77 provided in the rings or hoops 74, 76, respectively, to be supported on the laterally outwardly extending container support wings 66 and 68 and the rods 98, 94 and 96, respectively. The breadth or internal diameters 85 of the rings 74 and 76 is greater than the maximum external diameters 83 of the containers 11 so that the containers can be easily removed from the rings. Also, the broader rings will allow containers 11 of different diameters to be freely set forth and supported therein.

ALTERNATE EMBODIMENT

Figure 6:
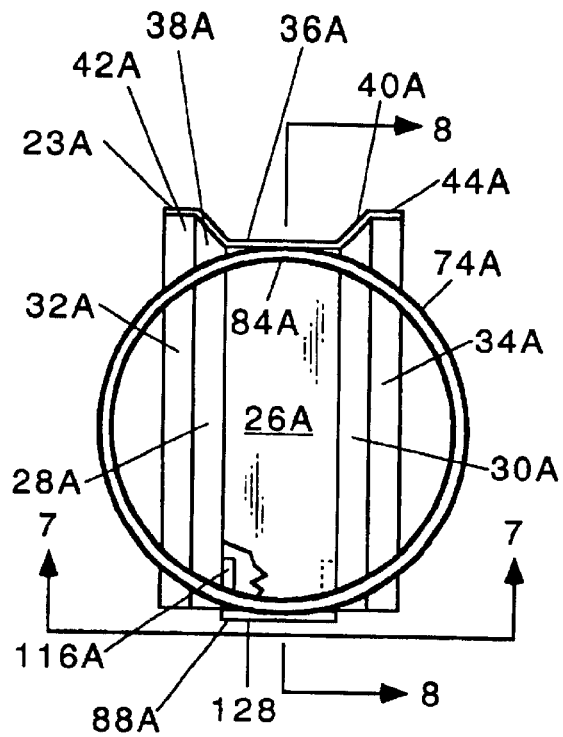
FIG. 6 is a top plan view of a slightly modified embodiment for mounting a single bucket.
Figure 7:
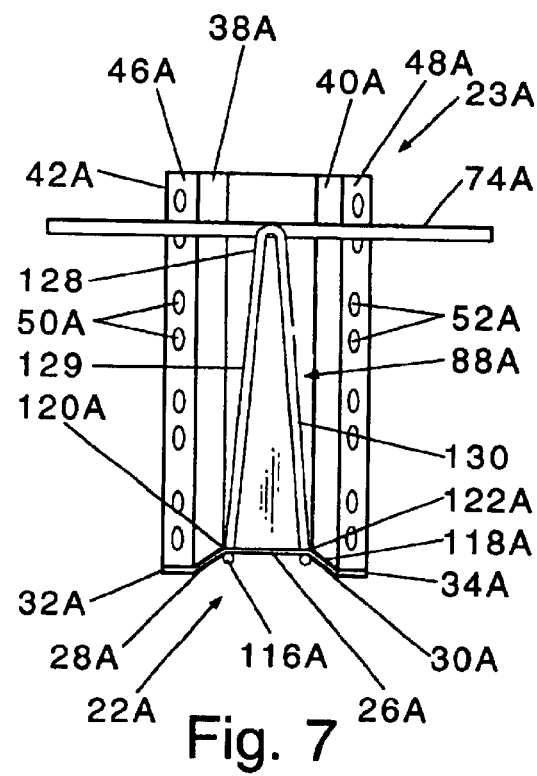
FIG. 7 is a front elevational view, taken along the line 7—7 of FIG. 6.
Figure 8:
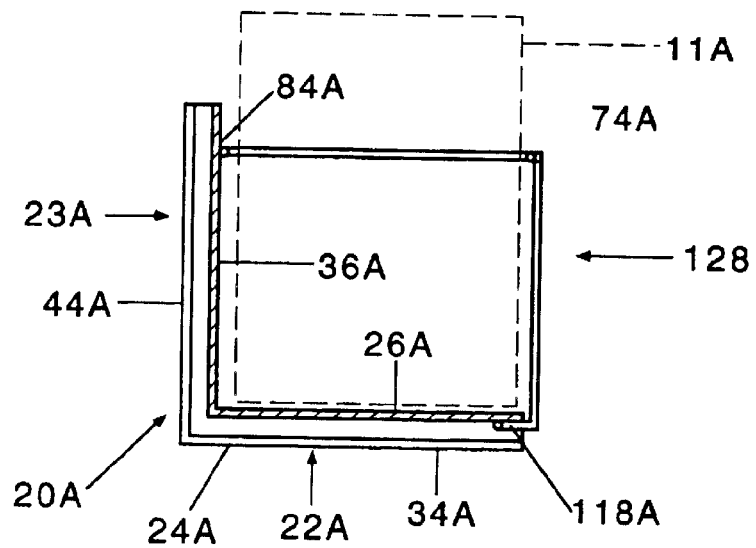
FIG. 8 is a sectional side elevational view, taken along the section line 8—8 of FIG. 6.
Figure 9:
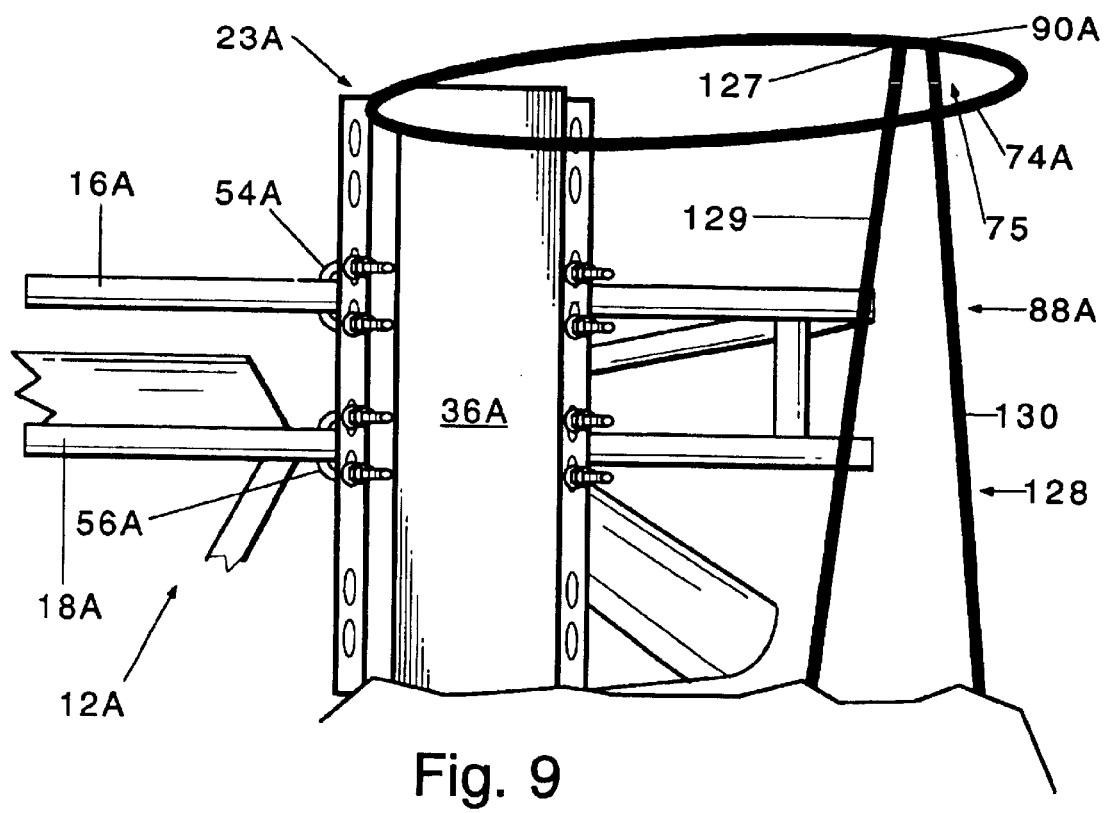
FIG. 9 is an enlarged view thereof without a bucket.
Figure 10:
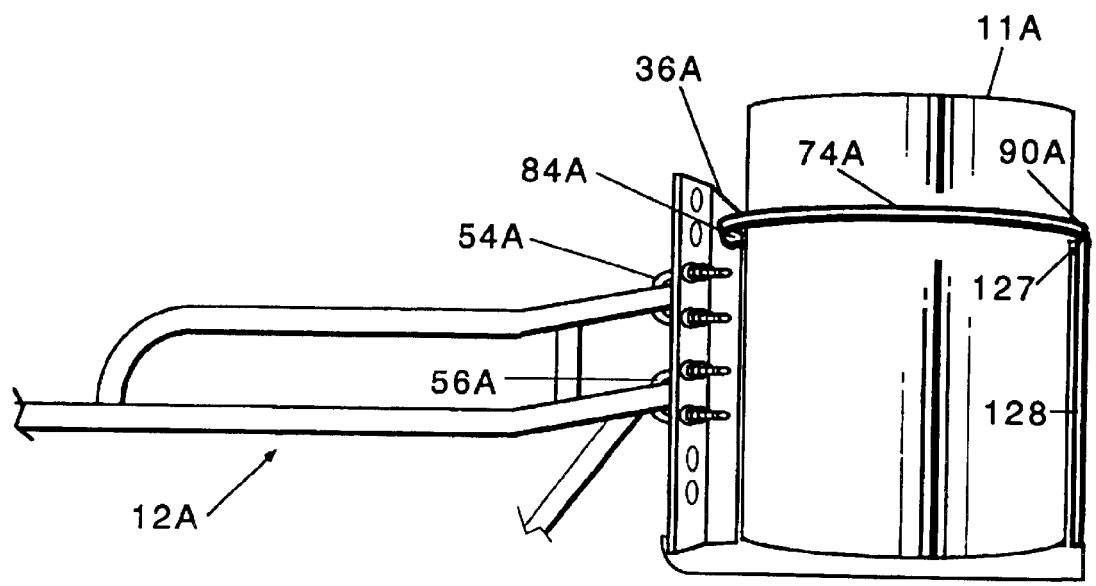
FIG. 10 is a similar perspective view thereof mounting the bucket.

The embodiment illustrated in FIGS. 6–8, generally designated 10A, is generally similar to the embodiment illustrated in FIGS. 1–5 and generally similar parts are identified with generally similar reference characters followed by the letter A subscript.

The embodiment illustrated in FIGS. 6–8 differs from that illustrated in FIGS. 1–5 in that rather than supporting the bucket 11A on the laterally extending wings and mounting rods, the bucket 11A is supported on the base leg 22A. Only one retainer ring 74A is illustrated and the forward distal portion 84A is tangentially welded directly to the vertical plate 36A on the vertical leg 23A. The rigidifying apparatus 88A merely includes an inverted V-shaped rigid rod 128 having an upper apex 127 to the rear ring portion 90A and downwardly diverging legs 129 and 130 terminating in forwardly extending rod sections 116A and 118A, respectively, welded to the junctions 120A and 122A of the base plate 26A and the legs 28A and 30A, respectively.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. An all terrain vehicle storage rack comprising:
a frame including
a generally horizontal base, and
generally upstanding support means mounted on said base;
means for detachably coupling said upstanding support means to an all terrain vehicle;
at least a first bucket receiving endless loop having an article receiving aperture there-through, including a first forward edge fixed to said upstanding support means and a first rear edge; and
loop mounting means having an upper end fixed to said first rear edge and a lower end fixed to said horizontal base for fixing said loop to said horizontal base;
said upstanding support means including a vertical plate having horizontally spaced apart rows of vertically spaced apart apertures for detachably receiving said means for detachably coupling said upstanding support means to an all terrain vehicle.

2. An all terrain vehicle storage rack comprising:
a frame including
a generally horizontal base, and
generally upstanding support means mounted on said base;
means for detachably coupling said upstanding support means to an all terrain vehicle;
at least a first bucket receiving endless loop having an article receiving aperture there-through, including a first forward edge fixed to said upstanding support means and a first rear edge; and
loop mounting means having an upper end fixed to said rear edge and a lower end fixed to said horizontal base for fixing said loop to said horizontal base;
said upstanding support means comprising a vertical channel having a vertical base, a pair of forwardly diverging vertical legs integrally coupled to said base and including terminal flanges lying in the same plane; said legs each including a plurality of vertical spaced apart apertures there through for detachably receiving said means for detachably coupling said upstanding support means to an all terrain vehicle.

3. The storage rack set forth in claim 2 wherein said horizontal base includes a downwardly opening channel including a horizontal plate; and a pair of horizontally spaced apart, downwardly diverging legs integrally joined at horizontally spaced junctions to horizontally spaced apart portions of said horizontal plate.

4. The storage rack set forth in claim 3 wherein said loop mounting means includes at least a pair of horizontally spaced apart, vertically diverging legs fixed to said first rear edge of said loop and to the junctions of said downwardly diverging legs and said horizontal plate.

5. The storage rack set forth in claim 4 wherein said vertically diverging legs include a pair of coplanar terminal flanges extending in horizontally opposite directions away from said horizontal plate.

6. An all terrain vehicle storage rack comprising:
a frame including
a generally horizontal base, and
generally upstanding support means mounted on said base;
means for detachably coupling said upstanding support means to an all terrain vehicle;
a first bucket receiving endless loop having an article receiving aperture there-through, including a first forward edge fixed to said upstanding support means and a first rear edge;
loop mounting means having an upper end fixed to said first rear edge and a lower end fixed to said horizontal base for fixing said loop to said horizontal base; and
a second bucket receiving endless loop having a second forward edge and a second rear edge;
said upstanding support means comprising an upstanding base; and a horizontal cross bar fixed to said base and including laterally outer terminal end portions;
said first and second forward edge portions of said loops being fixed to said terminal end portions;
said loop mounting means including a rod spanning said horizontal base and said rear edge of each of said first and second loops.

7. An all terrain vehicle storage rack comprising:
a frame including
a generally horizontal base, and
generally upstanding support means mounted on said base;
means for detachably coupling said upstanding support means to an all terrain vehicle;
a first bucket receiving endless loop having an article receiving aperture there-through, including a first forward edge fixed to said upstanding support means and a first rear edge;
loop mounting means having an upper end fixed to said first rear edge and a lower end fixed to said horizontal base for fixing said loop to said horizontal base; and
a second endless bucket receiving loop horizontally adjacent said first loop and having a second forward edge fixed to said upstanding support means and a second rear edge; and
said loop mounting means including
a base rod mounted on and extending horizontally outwardly away from opposite sides of said horizontal base,
a pair of rearwardly extending rods extending rearwardly of said base rod;
a pair of upwardly extending rods, integral with said rearwardly extending rods, having upper ends fixed to said first and second rear edges.

8. The storage rack set forth in claim 7 wherein said loop mounting means includes a pair of downwardly extending rods, integral with said upper ends of said upwardly extending rods, including lower terminal ends fixed to said horizontal base.

9. The storage rack set forth in claim 8 including a pair of bucket support wings each having a horizontally inner end fixed to said horizontal base and a horizontally outer end disposed above the junctions of said base rod and said rearwardly extending rods.

10. An all terrain vehicle storage rack comprising:
a frame including
a generally horizontal base, and
generally upstanding support means mounted on said base;
means for detachably coupling said upstanding support means to an all terrain vehicle;
at least a first bucket receiving endless loop having an article receiving aperture there-through, including a first forward edge fixed to said upstanding support means and a first rear edge; and
loop mounting means having an upper end fixed to said first rear edge and a lower end fixed to said horizontal base for fixing said loop to said horizontal base;

said loop mounting means including a rod having opposite ends fixed to said first rear edge of said loop and said horizontal base and an intermediate rod portion between said ends extending downwardly and thence forwardly to a bucket support position underlying an article to be received by said loop.

11. A storage rack for mounting an article, such as a bucket, on an all terrain vehicle comprising:
an L-shaped bracket including
a horizontal article support leg having forward and rear end portions and
an upstanding leg mounted on said forward end portion of said horizontal leg for supporting at least one article thereon;
at least one article receiving loop including
forward and rear edge portions, and
and an opening therethrough for receiving the article therein; and
first loop mounting means for mounting said loop on said upstanding leg;
said horizontal leg including a longitudinally extending base plate and a transverse base rod fixed to said base, and including laterally opposite ends laterally spaced from said base for supporting a pair of the laterally spaced apart articles thereon.

12. The storage rack set forth in claim 11 including second loop mounting means comprises a pair of rearwardly and upwardly extending rods extending rearwardly of said laterally opposite ends and fixed to said rear edge portion of each of said loops.

13. The storage rack set forth in claim 12 wherein said second loop mounting means includes a pair of downwardly converging rods integral with said rearwardly and upwardly extending rods and including a pair of terminal ends fixed to said base.

14. The storage rack set forth in claim 11 wherein said base includes a flat sheet and a pair of downwardly diverging legs depending from opposite sides of said flat sheet; said terminal ends being fixed to the junctions of said base and said downwardly diverging legs.

15. The storage rack set forth in claim 14 wherein said upstanding leg includes two lateral rows of vertically spaced holes for receiving mounting fasteners for coupling the rack to the all terrain vehicle.

16. An all terrain vehicle bucket support rack for mounting a bucket on an all terrain vehicle comprising:
an L-shaped mounting bracket including
a base leg, and
an upstanding leg fixed thereto;
means for mounting said upstanding leg on the all terrain vehicle;
a pair of bucket mounting hoops each having a bucket receiving aperture therethrough for receiving a pair of the buckets, each of said hoops including front and rear opposite end portions;
means for fixedly mounting said front end portion of each of said hoops to said upstanding leg; and
a transversely extending bucket support fixed to said base leg including laterally outer terminal ends for supporting a pair of laterally spaced buckets thereon, and
hoop mount means for fixedly mounting said rear end portions to said base leg including a pair of upwardly rearwardly extending rods fixed to said laterally outer terminal ends and including upper terminal ends fixed to said rear end portions.

17. The all terrain vehicle bucket support rack set forth in claim 16 wherein said hoop mount means comprises a pair of downwardly converging rods having upper ends integral with said upper terminal ends and lower ends fixed to said base leg.

18. The bucket support rack set forth in claim 17 wherein said bucket support comprises a transversely extending base rod fixed to said base and a transversely extending plate mounted on said base leg and including terminal ends which overlie and are fixed to said terminal ends of said base rod.

19. The bucket support rack set forth in claim 17 wherein said bucket has a predetermined maximum outside diameter; said hoop having a predetermined greater diameter.

20. An all terrain vehicle accessory rack for mounting at least one container thereon comprising:
a mounting bracket including
a horizontally disposed container support rack, for vertically supporting a container thereon, and
a vertically disposed mounting rack for mounting on an all terrain vehicle
at least one circular retainer mounted on said vertically disposed mounting rack; and
first mount means for detachably mounting said bracket on the all terrain vehicle;
second mount means for supporting said circular retainer on said horizontally disposed support rack;
said container support rack including an elongate plate having forward and rear ends and a transverse container support mounted on said base between said forward and rear ends and including terminal ends spaced from said elongate plate; and
means for mounting said circular retainer on said horizontally disposed support rack including a pair of horizontally spaced apart rods having front ends fixed to said terminal ends of said transverse container support and rearwardly upwardly extending rods fixed to said circular retainer.

21. Apparatus for mounting a container to a cargo rack on an all terrain vehicle comprising:
a support platform having a predetermined breadth on which at least one of the containers can rest;
at least a first container retaining ring, having a greater predetermined breadth greater than said predetermined breadth for enveloping a container supported by said support platform;
bracket means on said support platform for mounting said container retaining ring in vertically spaced relations above said platform; and
means for mounting said platform on the cargo rack;
said bracket means comprising a vertical plate extending upwardly from said support platform and including a pair of horizontally spaced apart rows of vertically spaced mounting apertures therein; said means for detachably mounting said platform including fasteners received in said apertures in each of said rows.

22. The apparatus set forth in claim 21, wherein said bracket means includes a pair of upwardly extending rigid mounting rods spanning said platform and said ring.

23. Apparatus for mounting a container to a cargo rack on an all terrain vehicle comprising:
a support platform having a predetermined breadth on which the container can rest;
a first container retaining ring, having a greater predetermined breadth greater than said predetermined breadth for enveloping a container supported by said support platform;
bracket means on said support platform for mounting said container retaining ring in vertically spaced relations above said platform;

means for mounting said platform on the cargo rack; and a second container retainer ring mounted on said bracket means laterally adjacent said first retainer ring;

said platform including an elongate horizontal plate, and a transverse plate mounted on said horizontal plate and including terminal container support ends spaced from said horizontal plate.

24. The apparatus set forth in claim 23 wherein each of said rings includes first and second circumferential spaced portions; said bracket means includes at least one upwardly extending rigid rod mounted on said platform and tangentially coupled to said first circumferentially spaced portion of each of said rings.

25. The apparatus set forth in claim 24 wherein said bracket means includes an upwardly extending plate fixed to said platform, and a transversely extending crossbar mounted on said plate and including terminal container ends spaced from said plate; said terminal ends of said crossbar being tangentially coupled to said second circumferentially spaced portion of each retainer ring.

26. The apparatus set forth in claim 25 including a rigidifying rod extending between each of said first circumferentially spaced portions and one of said terminal container support ends.

27. The apparatus set forth in claim 26 wherein said upwardly extending rods and said rigidifying rods are integral.

28. Apparatus for mounting a container to a cargo rack on an all terrain vehicle comprising:

a support platform having a predetermined breadth on which at least one of the containers can rest;

at least a first container retaining ring, having a greater predetermined breadth greater than said predetermined breadth for enveloping a container supported by said support platform;

bracket means on said support platform for mounting said container retaining ring in vertically spaced relations above said platform; and means for mounting said platform on the cargo rack;

said support platform comprising an elongate base having first and second ends; said bracket means comprising an upwardly extending plate integral with said first end of said elongate base; and upwardly extending rigid bar means fixed to said second end of said elongate base; said first container ring being fixed to said upwardly extending plate and to said upwardly extending rigid bar means.

29. The apparatus set forth in claim 28 wherein said rigid bar means includes a pair of upwardly converging rigid bars.

30. The apparatus set forth in claim 28 wherein said support platform includes transversely extending support means projecting laterally outwardly away from said elongate base to provide first and second laterally spaced container supports for supporting a pair of containers in laterally spaced position; and including a second container retainer ring mounted on said bracket means laterally adjacent said first container retainer means to dispose said first and second retainer rings above said first and second laterally spaced container supports, respectively.

31. The apparatus set forth in claim 30 wherein said bracket means includes a rigidifying base rod portion spanning said elongate plate and said terminal container support ends, a pair of rearwardly upwardly extending rods integral with base rod and fixed to a portion of each of said rings distal from said upwardly extending plate; and a downwardly extending rod portion integral with each of said upwardly extending rod and fixed to said elongate plate.

* * * * *